(12) United States Patent
Hayashi et al.

(10) Patent No.: US 8,807,806 B2
(45) Date of Patent: Aug. 19, 2014

(54) ILLUMINATION DEVICE FOR VEHICLE

(75) Inventors: Nobuki Hayashi, Toyota (JP); Kouichi Takeuchi, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 281 days.

(21) Appl. No.: 13/414,270

(22) Filed: Mar. 7, 2012

(65) Prior Publication Data

US 2012/0257402 A1 Oct. 11, 2012

(30) Foreign Application Priority Data

Apr. 7, 2011 (JP) ................................ 2011-085193

(51) Int. Cl.
*F21V 7/00* (2006.01)
*B60Q 3/02* (2006.01)
*B60Q 3/00* (2006.01)

(52) U.S. Cl.
CPC .............. *B60Q 3/0233* (2013.01); *B60Q 3/004* (2013.01); *B60Q 3/0223* (2013.01)
USPC ...... 362/501; 362/516; 362/509; 362/296.01; 362/310; 362/341; 362/347

(58) Field of Classification Search
None
See application file for complete search history.

(56) References Cited

U.S. PATENT DOCUMENTS

| 7,938,566 B2 | 5/2011 | Ishida et al. |
| 8,356,921 B2 | 1/2013 | Fujita |
| 2005/0013139 A1* | 1/2005 | Sugihara et al. ............. 362/490 |
| 2007/0217202 A1* | 9/2007 | Sato .............................. 362/294 |
| 2009/0196058 A1 | 8/2009 | Ishida et al. |
| 2011/0002138 A1* | 1/2011 | Hayes et al. .................. 362/551 |
| 2011/0121730 A1* | 5/2011 | Ito et al. ........................... 315/77 |
| 2013/0130674 A1* | 5/2013 | De Wind et al. ............... 455/420 |

FOREIGN PATENT DOCUMENTS

| CN | 101503078 | 8/2009 |
| JP | 2005-247317 A | 9/2005 |
| JP | 2010-070116 | 4/2010 |

OTHER PUBLICATIONS

U.S. Appl. No. 13/414,992 to Nobuki Hayashi et al., which was filed Mar. 8, 2012.
U.S. Appl. No. 13/470,585 to Nobuki Hayashi, which was filed May 14, 2012.
Chinese Office Action dated Mar. 26, 2014, along with English-language translation thereof.

* cited by examiner

*Primary Examiner* — Ashok Patel
(74) *Attorney, Agent, or Firm* — Greenblum & Bernstein, P.L.C.

(57) ABSTRACT

An illumination device for a vehicle includes a light source and an inside handle well. The inside handle well has a lower wall, an upper wall, and an opening. The light source is arranged under the lower wall. The lower wall has a light exit portion configured such that light emitted from the light source exits therethrough and travels to an inside of the inside handle well. The upper wall has a light reflecting portion configured to reflect light exiting through the light exit portion and traveling upward in the inside handle well toward the inside handle. The opening is formed on the inner side of the interior of the vehicle.

17 Claims, 13 Drawing Sheets

ILLUMINATION DEVICE FOR VEHICLE

CROSS REFERENCE TO RELATED APPLICATION

This application claims priority from Japanese Patent Application No. 2011-085193 filed Apr. 7, 2011. The entire content of this priority application is incorporated herein by reference.

FIELD OF THE INVENTION

The present disclosure relates to an illumination device for a vehicle.

BACKGROUND OF THE INVENTION

A known illumination device for illuminating an inside door handle of a vehicle includes a light source arranged above the door handle so as to illuminate the door handle from above. With the illumination, the door handle can be easily recognized and thus usability thereof improves.

Another know illumination device includes a light source arranged in under an inside door handle so as to illuminate the door handle from below. The illumination device can also illuminate other parts with light emitted downward. With this type of illumination device, the upper part of the door handle is less likely to be illuminated with a sufficient amount of light and thus the visibility of the door handle may decreases.

SUMMARY OF THE INVENTION

The present invention has been made in view of the aforementioned circumstances. An objective of the present invention is to provide an illumination device configured to illuminate an inside door handle of a vehicle so that high visibility of the door handle can be achieved.

An illumination device for a vehicle may include a light source and inside handle well. The inside handle well may be disposed in a door trim of the vehicle for housing an inside handle including a holding portion. The inside handle well may have a lower wall, an upper wall, and an opening. The light source may be arranged under the lower wall. The lower wall may have a light exit portion configured such that light emitted from the light source exits therethrough and travels to an inside of the inside handle well therethrough. The upper wall may have a light reflecting portion configured to reflect light exiting through the light exit portion and traveling upward in the inside handle well toward the inside handle. The opening may be on an inner side of the interior of the vehicle.

The light that exits through the light exit portion and travels upward in the inside handle well is reflected toward the inside handle by the light reflecting portion. As a result, the inside handle is illuminated with the reflected light from above. Even though the light source is arranged below the inside handle, high visibility of the inside handle can be achieved.

An illumination device for a vehicle of another aspect of the present invention may include a light source, an inside handle well, and a light reflector having the following configurations.

The inside handle well may be disposed in a door trim of a vehicle for housing an inside handle including a holding portion. The inside handle well may have a lower wall, an upper wall, and an opening. The lower wall may have a light exit portion configured such that light emitted from the light source arranged under the lower wall exits therethrough and travels to an inside of the inside handle well. The upper wall may have a mounting hole that is a through hole. The opening may be on an inner side of an interior of the vehicle. The light reflector may be attached to the upper wall so as to close the mounting hole of the upper wall and configured to reflect light exiting through the light exit portion and traveling upward in the inside handle well toward the inside handle.

An illumination device for a vehicle of another aspect of the present invention may include a light source, an inside handle well, and a light reflector having the following configurations.

The inside handle well may be disposed in a door trim of a vehicle for housing an inside handle including a holding portion. The inside handle well may have a lower wall, an upper wall, a back wall and an opening. The lower wall may have a light exit portion configured such that light emitted from the light source arranged under the lower wall exits therethrough and travels to an inside of the inside handle well. The upper wall and the back wall have cutout portions forming a mounting hole. The opening may be on an inner side of an interior of the vehicle. The light reflector may be attached to the upper wall and the back wall so as to close the mounting hole and configured to reflect light exiting through the light exit portion and traveling upward in the inside handle well toward the inside handle.

The light reflector may extends along the holding portion of the inside handle.

With the configuration described above, the illumination device that can improve the visibility of the inside handle is provided.

DETAILED DESCRIPTION OF THE PREFERRED EMBODIMENTS

<First Embodiment>

Figure 1:
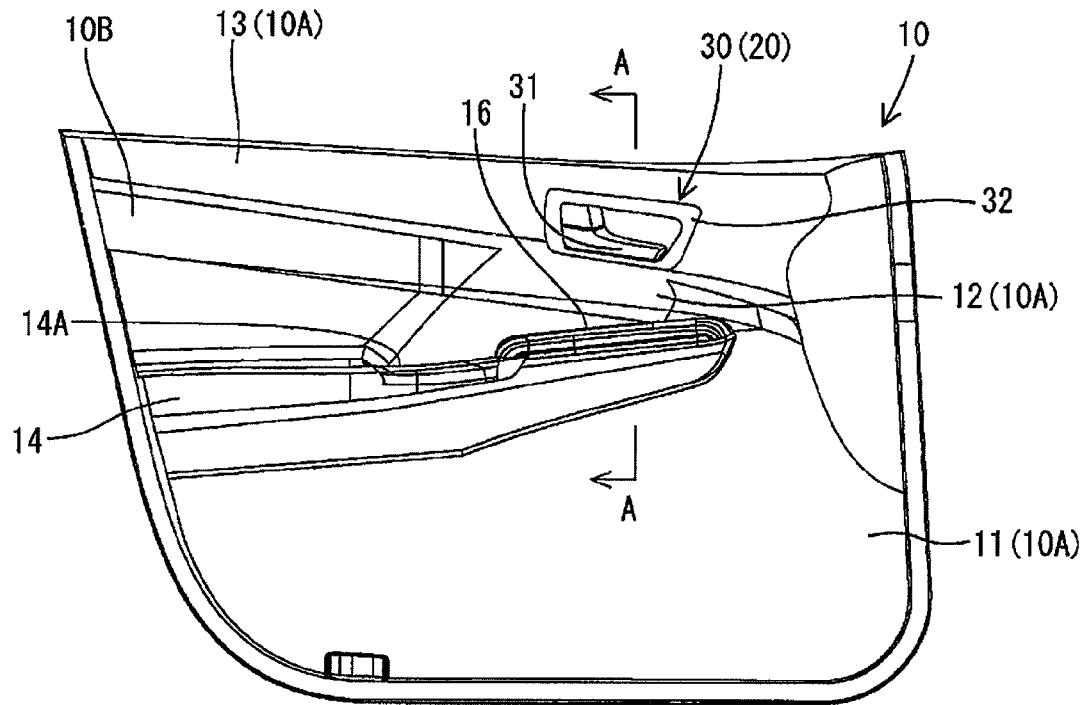
FIG. 1 is a front view of a door trim for a vehicle to which an illumination device for a vehicle according to the first embodiment is mounted.

The first embodiment will be explained with reference to FIGS. 1 to 8. A door trim 10 illustrated in FIG. 1 is an interior part of a vehicle to be attached to an interior surface of an inner panel of the vehicle. The door trim 10 and the inner panel are parts of a door of the vehicle.

The door trim 10 is used to improve appearance of the interior of the vehicle and passenger comfort in the vehicle.

The door trim 10 includes a trim board 10A and an ornament 10B mounted to the trim board 10A. As illustrated in FIG. 1, the trim board 10A is constructed of three parts, a lower board 11 in the lower section, a middle board 12 in the middle section, and an upper board 13 in the upper section. The trim board 10A is not limited to such a configuration and can be constructed of a single part.

Figure 4:
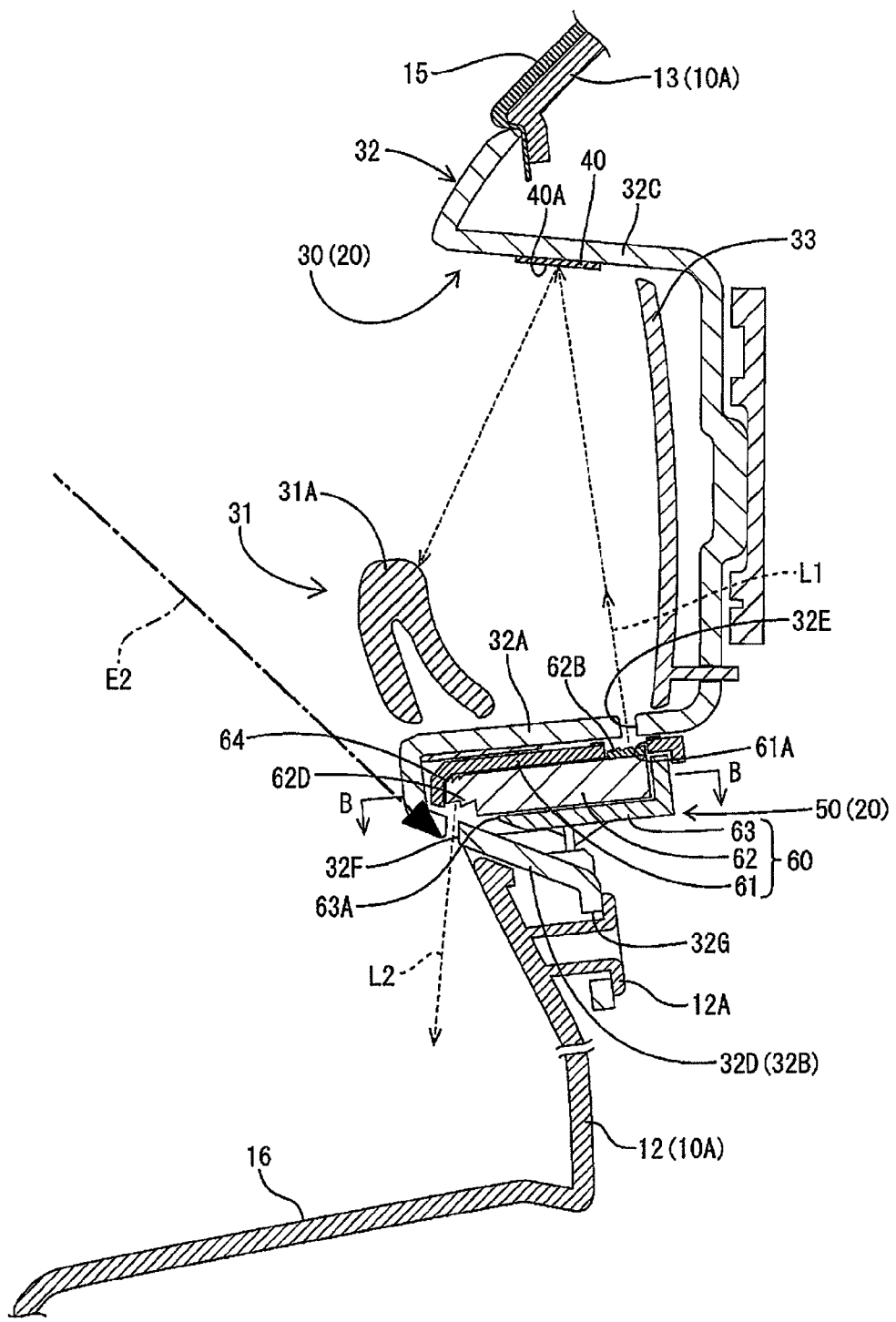
FIG. 4 is a cross-sectional view of the illumination device along line A-A in FIG. 1.

The lower board 11, the middle board 12, and the upper board 13 are made of synthetic resin such as polypropylene or synthetic resin mixed with natural fibers such as kenaf fibers. As illustrated in FIG. 4, a door trim skin 15 is attached to a part of or an entire inner surface of the door trim 10. The boards 11, 12 and 13 are connected together by inserting mounting bosses thereof into respective through holes of the respective boards 11, 12 and 13, and by welding tips of the bosses. The welding of the tips of the bosses may be performed by ultrasonic welding. Alternatively, the boards 11, 12 and 13 may be connected with screws, hooks, or other types of fastening members.

As illustrated in FIG. 1, the middle board 12 includes an armrest 14 for an occupant to rest his or her arm. The armrest 14 projects toward the inner side of the interior of the vehicle. The armrest 14 has a recess 14A in which a pull handle (not illustrated) for opening and closing the door is arranged. The armrest 14 has an opening in the upper surface so that the occupant can reach the pull handle through the opening to open or close the door with his or her fingers.

The upper board 13 has an inside handle well 30 that holds a handle 31A (a holding portion) of an inside handle assembly 31 therein. The inside handle assembly 31 is used to open and close the door of the vehicle. A switch base 16 including switches (not illustrated) is arranged on the upper surface of the armrest 14 below the inside handle well 30.

As illustrated in FIG. 4, the illumination device 20 includes a light source 50 configured to illuminate the inside of the inside handle well 30 and the switch base 16. The inside handle well 30 includes an inside handle bezel 32 and an inside handle cover 33. The inside handle well 30, the inside handle bezel 32, and the inside handle cover 33 may be hereinafter referred to as the well 30, the bezel 32, and the cover 33, respectively.

Figure 2:
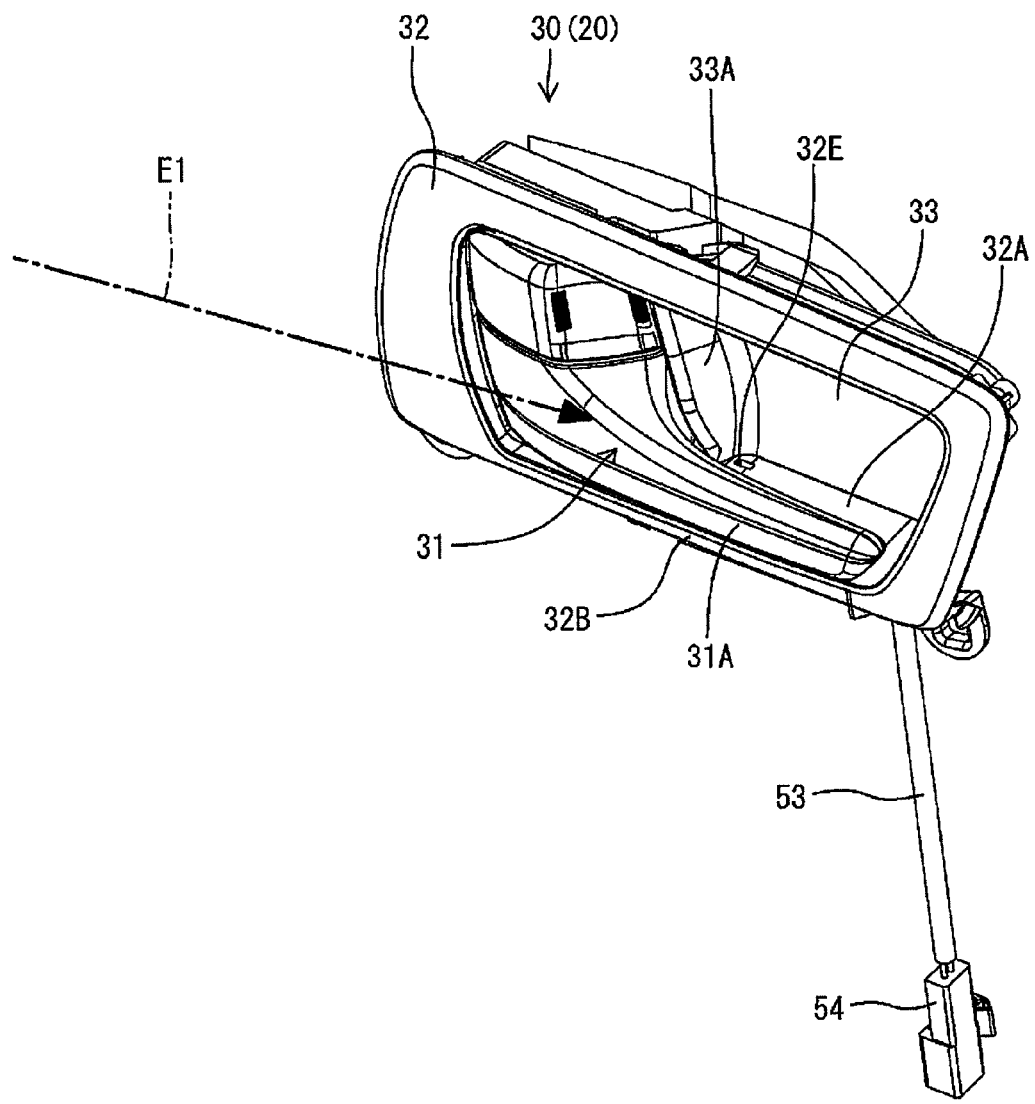
FIG. 2 is a perspective view of the illumination device.
Figure 3:
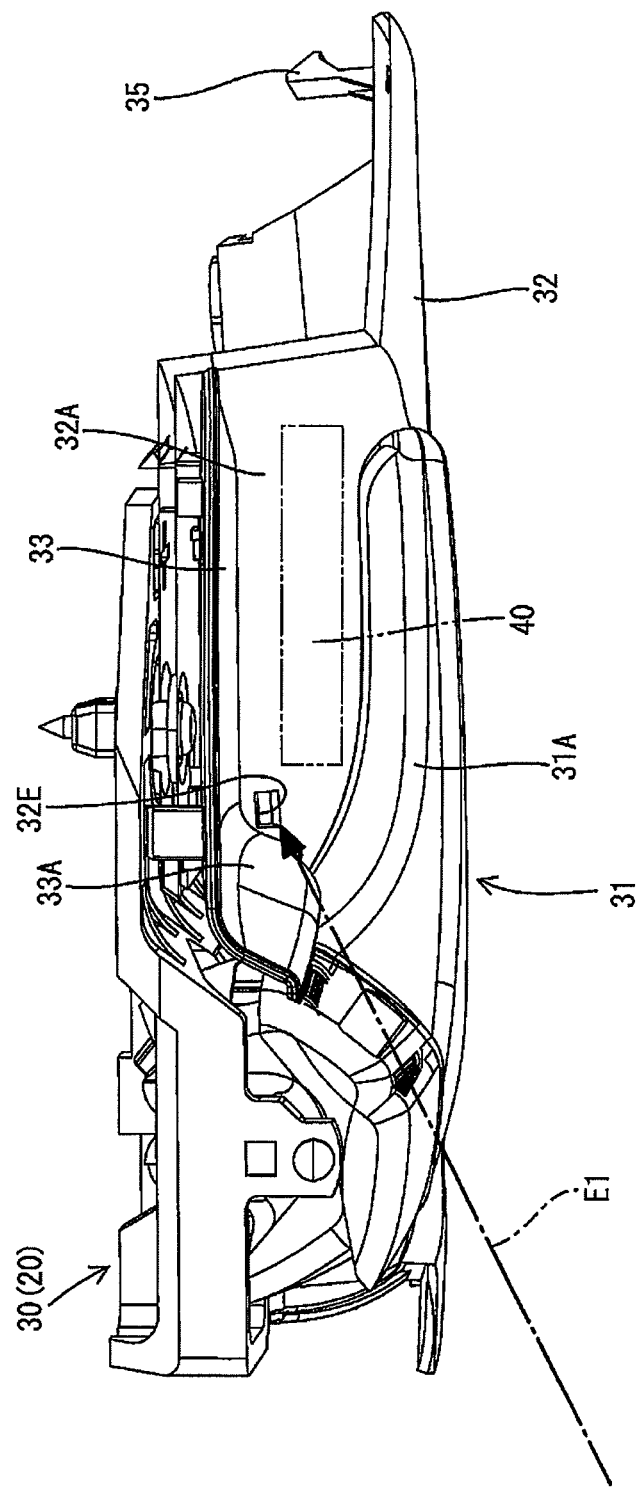
FIG. 3 is a plan view of the illumination device.

As illustrated in FIGS. 2 and 4, the bezel 32 has a rectangular front-view shape and an opening on the inner side of the interior of the vehicle. As illustrated in FIG. 3, the bezel 32 has a hook 35 projecting toward the interior of the vehicle and hooked to the trim board 10A. The cover 33 is mounted so as to cover the back wall of the bezel 32, that is, the cover 33 is a part of the back wall.

The light source 50 is arranged below the lower wall 32A of the bezel 32 (i.e., the lower wall of the inside handle well 30). As illustrated in FIG. 4, an extending wall 32B extends from edges of the lower wall 32A so as to cover the light source 50 from below and sides. Namely, a recess defined by the lower wall 32A and the extending wall 32B is used as a light source holding recess for holding the light source 50. The light source 50 is held in the light source holding recess.

The lower wall 32A has a light exit hole 32E through which light emitted from the light source 50 exits and enters into the inside handle well 30. The extending wall 32B includes a sloped portion 32D on the lower side. The sloped portion 32D inclines toward the inner side of the interior of the vehicle. The sloped portion 32D has a lower light exit hole 32F (a lower light exit portion) through which light emitted from the light source 50 exits.

The light emitted from the light source 50 enters into the inside handle well 30 through the light exit hole 32E and illuminates the inside of the inside handle well 30. Furthermore, the light emitted from the light source 50 exits downward through the lower light exit hole 32F and illuminates the switch base 16 arranged under the lower light exit hole 32F.

The lower light exit hole 32F is formed in the sloped portion 32D. Therefore, the occupant is less likely to recognize the lower light exit hole 32F (see line E2 in FIG. 4 indicating a line of sight of the occupant), that is, the decent appearance can be provided.

The travel direction of the light exiting through the lower light exit hole 32F is not limited to the downward (or toward the switch base 16). The sloped portion 32D and the lower light exit hole 32F may be configured such that the light exits the lower light exit hole 32F and travel sideward (toward the left in FIG. 4).

As illustrated in FIG. 4, the extending wall 32 has a mounting hole 32G through which a mounting boss 12A projecting from the middle board 12 is passed. The mounting boss 12A is passed through the mounting hole 32G and the tip thereof is welded by ultrasonic welding or other type of welding method. As a result, the extending wall 32B of the bezel 32 is connected to the middle board 12.

Figure 5:
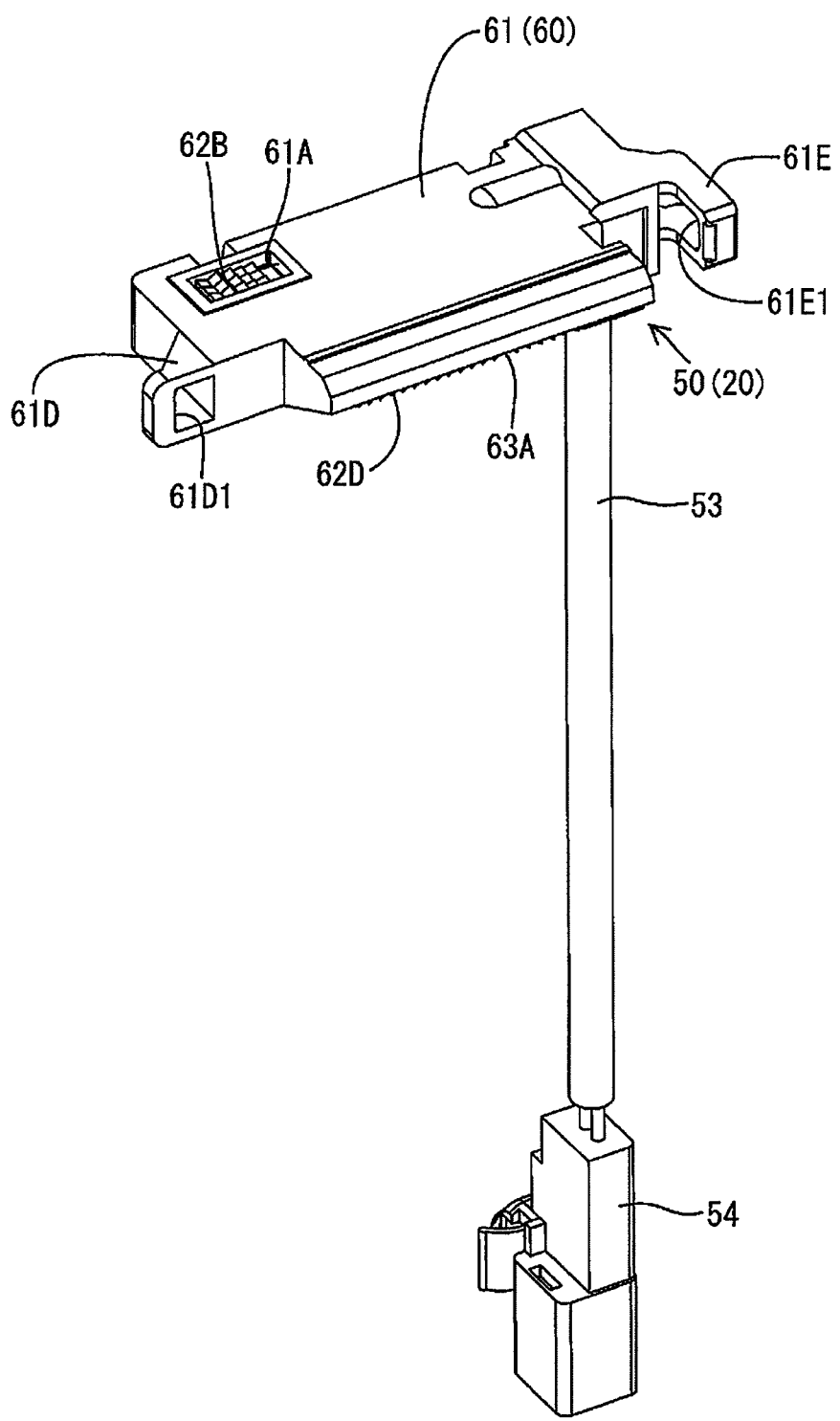
FIG. 5 is a perspective view of a light source of the illumination device.
Figure 6:
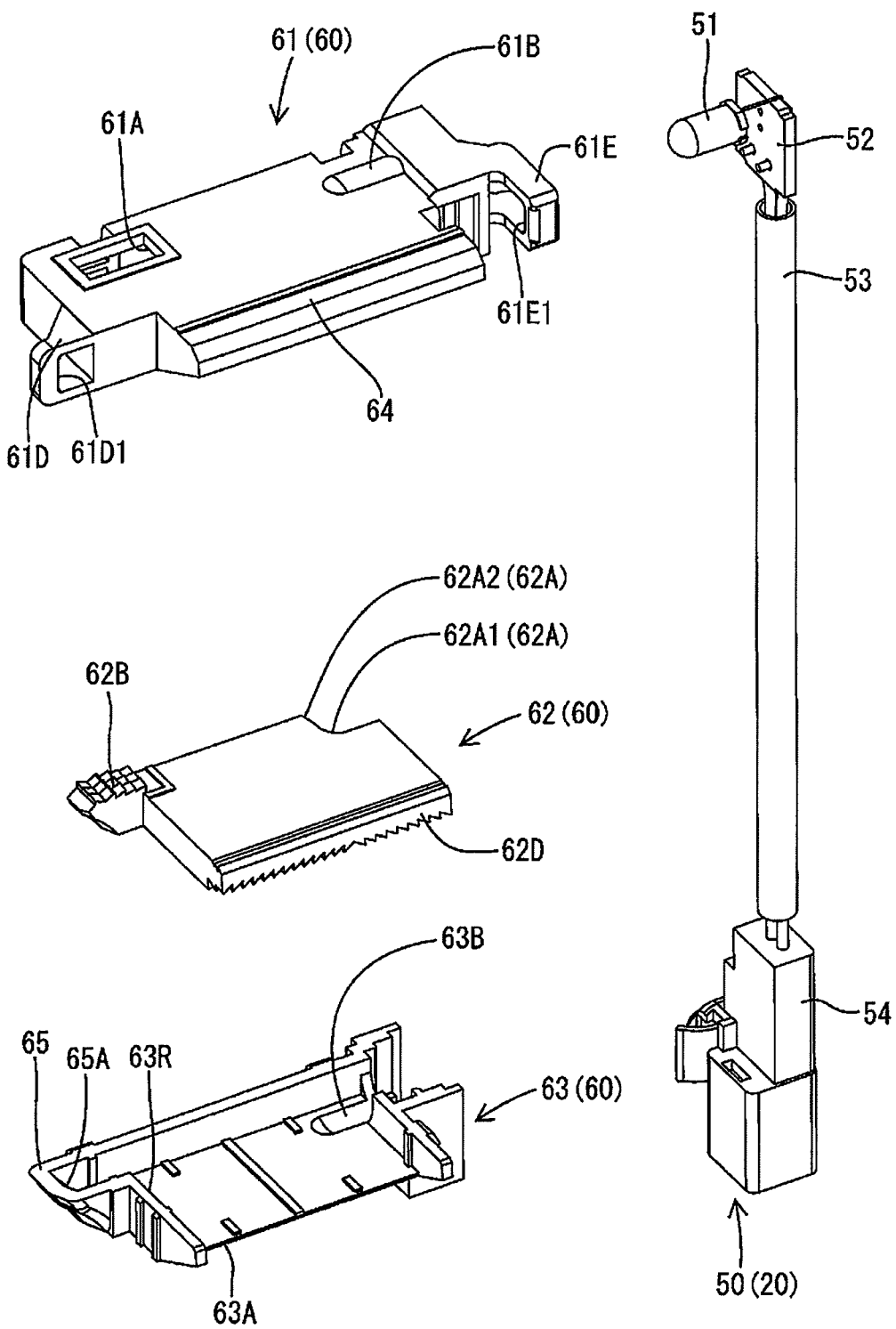
FIG. 6 is an exploded perspective view of the light source.

As illustrated in FIG. 6, the light source 50 includes an LED 51 and a light guide member 60. As illustrated in FIGS. 5 and 6, the light guide member 60 includes a lens 62, an upper cover 61, and a lower cover 63. The lens 62 has a plate-like shape with a substantially rectangular plan-view shape. The upper cover 61 and the lower cover 63 cover the LED 51 and the lens 62 from the top and the bottom, respectively, and hold them therebetween. The light guide member 60 is configured to guide light emitted from the LED 51 toward the light exit hole 32E (further toward the inside of the well 30) and the lower light exit hole 32F (further toward the switch base 16).

As illustrated in FIG. 6, the LED 51 is mounted on a circuit board 52. Electrical wires 53 are connected to the circuit board 52 at one end and to a connector 54 at the other end. The LED 51 is electrically connected to a power supply (not illustrated) via the electrical wires 53 and the connector 54.

Figure 7:
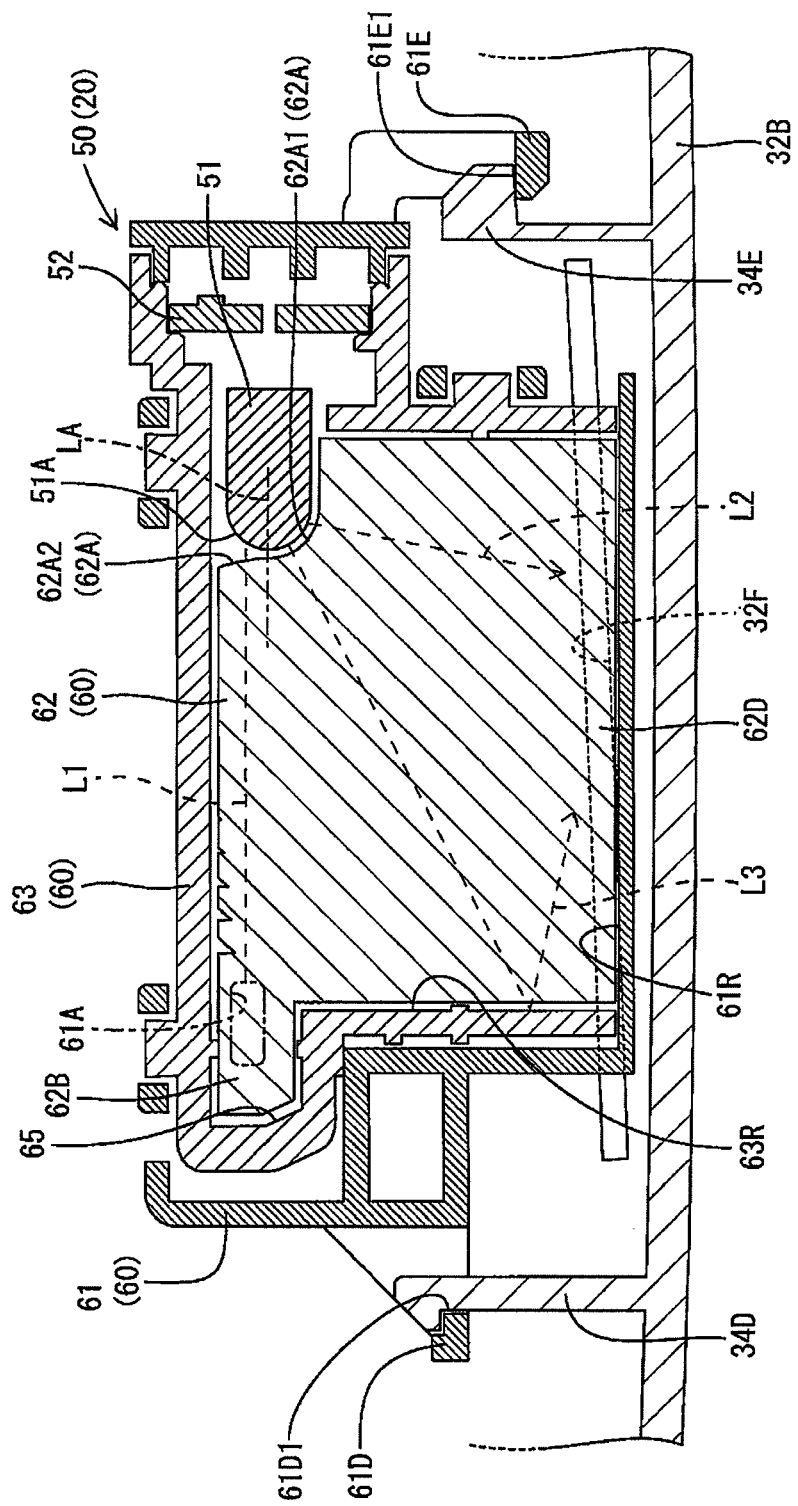
FIG. 7 is a cross-sectional view of the light source along line B-B in FIG. 4.

The lens 62 is made of synthetic resin having a high capability of light transmission (or highly transparent synthetic resin) such as acrylic. As illustrated in FIG. 7, a corner of the lens 62 close to the LED 51 is cut off along a curved line and a light entrance surface 62A is provided. The LED 51 is arranged such that a light emitting surface 51A thereof faces the light entrance surface 62A. With this configuration, light emitted from the LED 51 enters the light entrance surface 62A.

The LED 51 is arranged with a light axis LA thereof aligned along the front-to-rear direction of the vehicle (the right-to-left direction in FIG. 7). Light emitted from the LED 51 through the light emitting surface 51A three-dimensionally radiates around the light axis LA within a specified angle range. The intensity of emitted light is significantly high along the light axis LA and tends to decrease as an angle to the light axis LA increases.

The upper cover 61 and the lower cover 63 are made of synthetic resin. The covers 61 and 63 have recesses 61B and 63B in the inner surfaces thereof, respectively. The LED 51 is fitted in the recesses 61B and 63B.

As illustrated in FIG. 7, the upper cover 61 has projecting portions 61D and 61E projecting from the respective sides thereof toward respective directions along the front-to-rear direction of the vehicle (or the right-to-left direction in FIG. 7). The projecting portions 61D and 61E have mounting holes 61D1 and 61E1, respectively. The mounting holes 61D1 and 61E1 are through holes. The bezel 32 includes mounting hooks 34D and 34E projecting from the extending wall 32B toward the outer side of the interior of the vehicle (the upper side of FIG. 7). The mounting hooks 34D and 34E are fitted in the mounting holes 61D1 and 61E1, respectively. As a result, the light source 50 is mounted to the bezel 32.

The inner surface 61R of the upper cover 61 and the inner surface 63R of the lower cover 63 are light reflecting surfaces configured to reflect light. The light reflecting surfaces may be prepared by making the upper cover 61 and the lower cover 63 from material in highly light reflective color such as white. Alternatively, the light reflecting surfaces my be prepared by applying highly light reflective paint, such as white paint, to the inner surfaces of the upper cover 61 and the lower cover 63.

As illustrated in FIG. 6, the upper cover 61 has an end wall 64 on the inner side of the interior of the vehicle. The end wall 64 is arranged opposite the lower light exit hole 32F. The end wall 64 declines toward the inner side of the interior of the vehicle (or a side away from the LED 51) so as to reflect light hitting the inner surface thereof downward.

As illustrated in FIG. 7, the lower cover 63 has projecting portion 65 that projects from an end thereof away from the LED 51 toward the rear of the vehicle. The projecting portion 65 is arranged on the same line on which the light axis LA of the LED 51 is arranged in plan view. An upper light emitting portion 62B of the lens 62 is arranged in space surrounded by walls of the projecting portion 65. As illustrated in FIG. 6, the bottom surface 65A of the projecting portion 65 inclines toward the rear of the vehicle (or the side away from the LED 51). With this configuration, light hitting the bottom surface 65A of the projecting portion 65 is reflected upward.

As illustrated in FIGS. 4 and 5, the upper cover 61 has a through hole 61A in an area opposite the light exit hole 32E of the bezel 32. The through hole 61A is formed so as to overlap the upper light emitting portion 62B of the lens 62 in plan view. Namely, the upper light emitting portion 62B is arranged so as to face the light exit hole 32E.

As illustrated in FIGS. 4 and 5, the lower cover 63 has a through hole 63A in an area opposite the lower light exit hole 32F. A lower light emitting portion 62D formed on the lower surface of the lens 62 is visible through the through hole 63A. The lower light emitting portion 62D is arranged so as to face the lower light exit hole 32F. As illustrated in FIG. 7, each of the lower light exit hole 32F and the lower light emitting portion 62D has an elongated shape that extends along the front-to-rear direction of the vehicle.

As illustrated in FIG. 7, the light entrance surface 62A includes a first curved surface 62A1 on the lower light emitting portion 62D side and a second curved surface 62A2 on the upper light emitting portion 62B side. The first curved surface 62A1 has a shape such that light from the LED 51 (indicated by arrow L2 in FIG. 7) is diffused in a wide range. The second curved surface 62A2 has a shape with a smaller curvature than that of the first curved surface 62A1 such that light from the LED 51 (indicated by arrow L1 in FIG. 7) is directed straight toward the upper light emitting portion 62B. Namely, the light passing through the second curved surface 62A2 is less likely to be diffused in comparison to the light passing through the first curved surface 62A1.

A portion of the light emitted from the LED 51 passes through the first curved surface 62A1. The portion of the light is diffused in the wide range and thus it is more likely to reach the lower light exit hole 32F for an entire length of the lower light exit hole 32F. The light passing through the second curved surface 62A2 is less likely to be diffused and thus more likely to reach the upper light emitting portion 62B.

As illustrated in FIG. 6, the upper surface of the upper light emitting portion 62B (a light exit surface) and the lower surface of the lower light emitting portion 62D (a light exit surface) have ridged shapes. With this configuration, light exiting from the upper light emitting portion 62B or the lower light emitting portion 62D to the outside of the lens 62 is refracted. As a result, a path of the light is adjusted. The shapes of the surfaces of the upper light emitting portion 62B and the lower light emitting portion 62D are not limited to the ridged shape and may be altered to different shapes.

With the configuration described above, the light emitted from the LED 51 enters the lens 62 through the light entrance surface 62A. A beam of the light in the lens 62 indicated by arrow L1 in FIG. 7 reaches the upper light emitting portion 62B and exits therefrom. A beam of light indicated by arrow L2 in FIG. 7 reaches the lower light emitting portion 62D and exits therefrom.

As illustrated in FIG. 4, the beam of light exiting from the upper light emitting portion 62B indicated by arrow L1 passes through the light exit hole 32E, enters into the well 30, and illuminates the inside of the well 30. The beam of light exiting from the lower light emitting portion 62D indicated by arrow L2 passes through the lower light exit hole 32F and travels toward the switch base 16. With the beam of light, the switch base 16 and the switches arranged thereon are illuminated and thus the visibility of them improves. Namely, the upper area above the light guide member 60 (or the inside of the inside handle well 30) and the lower area below the light guide member 60 (or the switch base 16) can be illuminated by a single light source 50.

Beams of light exiting from parts of the lens 62 other than the upper light emitting portion 62B and the lower light emitting portion 62D are reflected by the inner surfaces of the upper cover 61 and the lower cover 63 (light reflecting surfaces) and travel back to the lens 62. A beam of light traveling in such a path is indicated by arrow L3 in FIG. 7. With the above configuration, the efficiency in use of light emitted from the LED 51 can be improved.

As illustrated in FIGS. 3 and 4, the light exit hole 32E is formed in an area of the lower wall 32A of the bezel 32 on the outer side of the interior of the vehicle than the handle 31A of the inside handle assembly 31 (more to the right in FIG. 4). The cover 33 has a protrusion 33A that protrudes toward the inner side of the interior of the vehicle. As illustrated in FIG. 3, the protrusion 33A is arranged more to the rear of the vehicle (or more to the left in FIG. 3) than the light exit hole 32E. The protrusion 33A functions as a light blocking portion that blocks light exiting from the light exit hole 32E toward the rear of the vehicle.

With the above configuration, beams of the light exiting from the light exit hole 32E and traveling toward the opening of the inside handle well 30 (or toward the interior of the vehicle) are blocked by the handle 31A of the inside handle assembly 31 or by the protrusion 33A (the light blocking portion). Namely, the light exit hole 32E is blocked by the protrusion 33A and the handle 31A in sight of the occupant. A line of sight of the occupant is indicated by arrow E1 in FIG. 2 or 3.

With the above configuration, the occupant rarely see the light exit hole 32E and light exiting therefrom. When the occupant is seated, positions of his or her eyes are usually more to the rear of the vehicle than the inside handle well 30. Therefore, the protrusion 33A is arranged more to the rear than the light exit hole 32E. To make the light exit hole 32E further less likely to be directly seen by the occupant, the protrusion 33A may be arranged closer to the light exit hole 32E.

The inside handle well 30 is illuminated with the light exiting upward from the light source 50. Because the positions of eyes of the seated occupant are usually above the inside handle well 30, the light exiting upward from the light source 50 is more likely to be recognized by the occupant than the light traveling downward. In this embodiment, the light exiting upward is blocked by the handle 31A and the protrusion 33A. Therefore, the occupant is less likely to directly see the light exit hole 32E and the light exiting therefrom even though the light exit hole 32E is provided in the lower wall 32A (or the lower surface) of the inside handle well 30.

As illustrated in FIG. 4, the illumination device 20 further includes a light reflector 40 (a light reflecting portion) on an upper wall 32C of the bezel 32, which is also an upper wall of the inside handle well 30. The light reflector 40 is configured to reflect beams of the light exiting upward from the light exit hole 32E and reaching the light reflector 40. The beams of the light are reflected toward the handle 31A of the inside handle assembly 31 as indicated by arrow L1.

The light reflector 40 is in a color having high light reflectivity such as white. The light reflector 40 may be a white tape. Alternatively, the light reflector 40 may be formed by applying paint having high light reflectivity, such as white paint, to the upper wall 32C.

Figure 8:
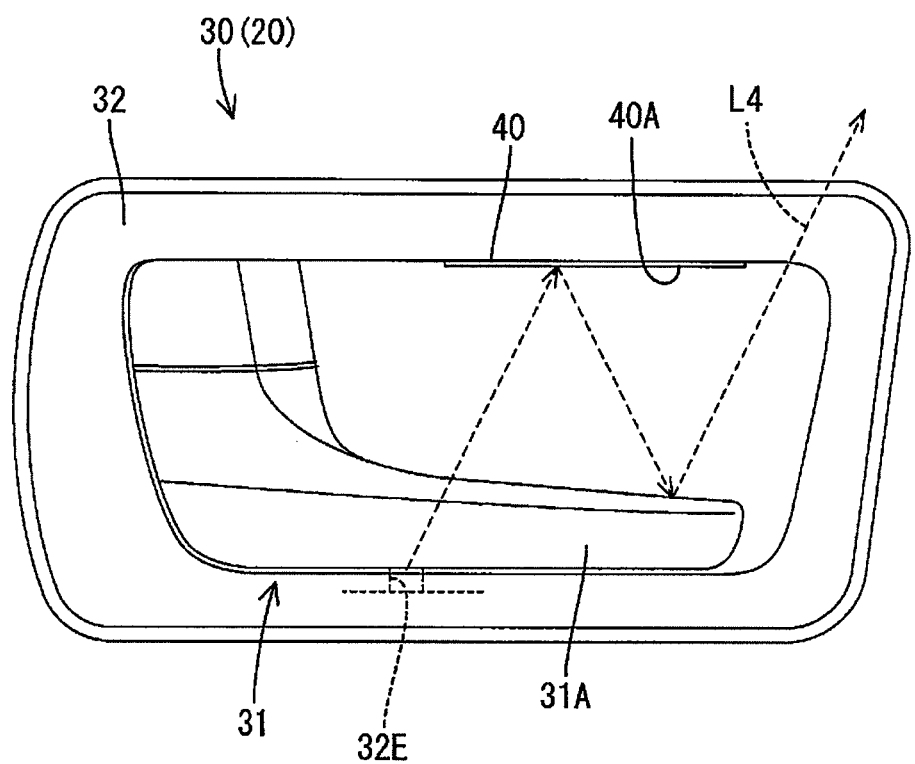
FIG. 8 is a magnified view of an inside handle.

As illustrated in FIGS. 3 and 8, the light reflector 40 may have a rectangular shape extending along the direction in which the handle 31A extends (i.e., the front-to-rear direction of the vehicle or the right-to-left direction in FIG. 3). The light reflector 40 is arranged between the handle 31A and the light exit hole 32E in plan view. Namely, the light reflector 40 is arranged on the outer side of the interior of the vehicle than the inside handle assembly 31. The light reflector 40 is more to the front of the vehicle (the right side in FIGS. 3 and 8) than the light exit hole 32E. In FIG. 3, the light reflector 40 is indicated by two-dot chain line.

The upper wall 32C of the bezel 32 is a sloped surface inclining toward the inner side of the interior of the vehicle. Therefore, a light reflecting surface 40A of the light reflector 40 is also a sloped surface inclining toward the inner side of the interior of the vehicle.

The light exiting upward from the light exit hole 32E is reflected by the light reflector 40 toward the inside handle assembly 31, or the handle 31A. The reflected light illuminates the handle 31A from above. In the configuration in which the light source 50 is arranged below the handle 31A of the inside handle assembly 31, the visibility of the handle 31A improves.

With the light source 50 arranged below the inside handle assembly 31, the parts other than the inside handle well 30 are illuminated with the light emitted downward from the light source 50. Furthermore, a problem caused by arranging the light source 50 below the inside handle assembly 31, such as a decrease in visibility of the inside handle 31A, can be solved.

The light reflector 40 extends along the direction in which the handle 31A extends.

With the above configuration, the reflected light by the light reflector 40 travels linearly along the direction in which the handle 31A extends. Therefore, the handle 31A is more properly illuminated along the direction in which it extends. As a result, the visibility of the handle 31A improves.

The light reflector 40 is arranged more to the front of the vehicle than the light exit hole 32E.

If the light reflector 40 is arranged more to the rear than the light exit hole 32E, the reflected light by the light reflector 40 travels toward the rear of the vehicle. Because the occupant is seated more to the rear of the vehicle than the inside handle assembly 31, the reflected light traveling toward the rear of the vehicle and reflected off the handle 31A may reach the eyes of the occupant. With the configuration of this embodiment, many beams of the light exiting from the light exit hole 32E and traveling toward the light reflector 40 indicated by arrow L4 in FIG. 8 are reflected toward the front (or the right in FIG. 8). Therefore, the reflected light by the light reflector 40 is less likely to reach the occupant seated more to the rear of the vehicle than the inside handle well 30 and the glare can be reduced.

The light reflector 40 is arranged between the inside handle assembly 31 and the light exit hole 32E in plan view.

With this configuration, the light exiting from the light exit hole 32E can be efficiently reflected toward the inside handle assembly 31 side (or the inner side of the interior of the vehicle). Therefore, the visibility of the handle 31A improves.

The light reflector 40 is arranged on the outer side of the interior of the vehicle than the inside handle assembly 31. The upper wall 32C of the inside handle well 30 inclines toward the inner side of the interior of the vehicle.

The light reflector 40 is arranged on the outer side of the interior of the vehicle than the inside handle assembly 31. The light reflector 40 is arranged on the sloped surface inclining toward the inner side of the interior of the vehicle. With this configuration, the light exiting from the light exit hole 32E is more likely to be reflected toward the inner side of the interior of the vehicle (or toward the inside handle assembly 31). As a result, the visibility of the handle 31A improves.

<Second Embodiment>

The second embodiment will be explained with reference to FIG. 9. The same parts as those in the first embodiment will be indicated by the same symbols and will not be explained. An illumination device 120 for a vehicle includes a light reflector having a different configuration from that in the first embodiment.

Figure 9:
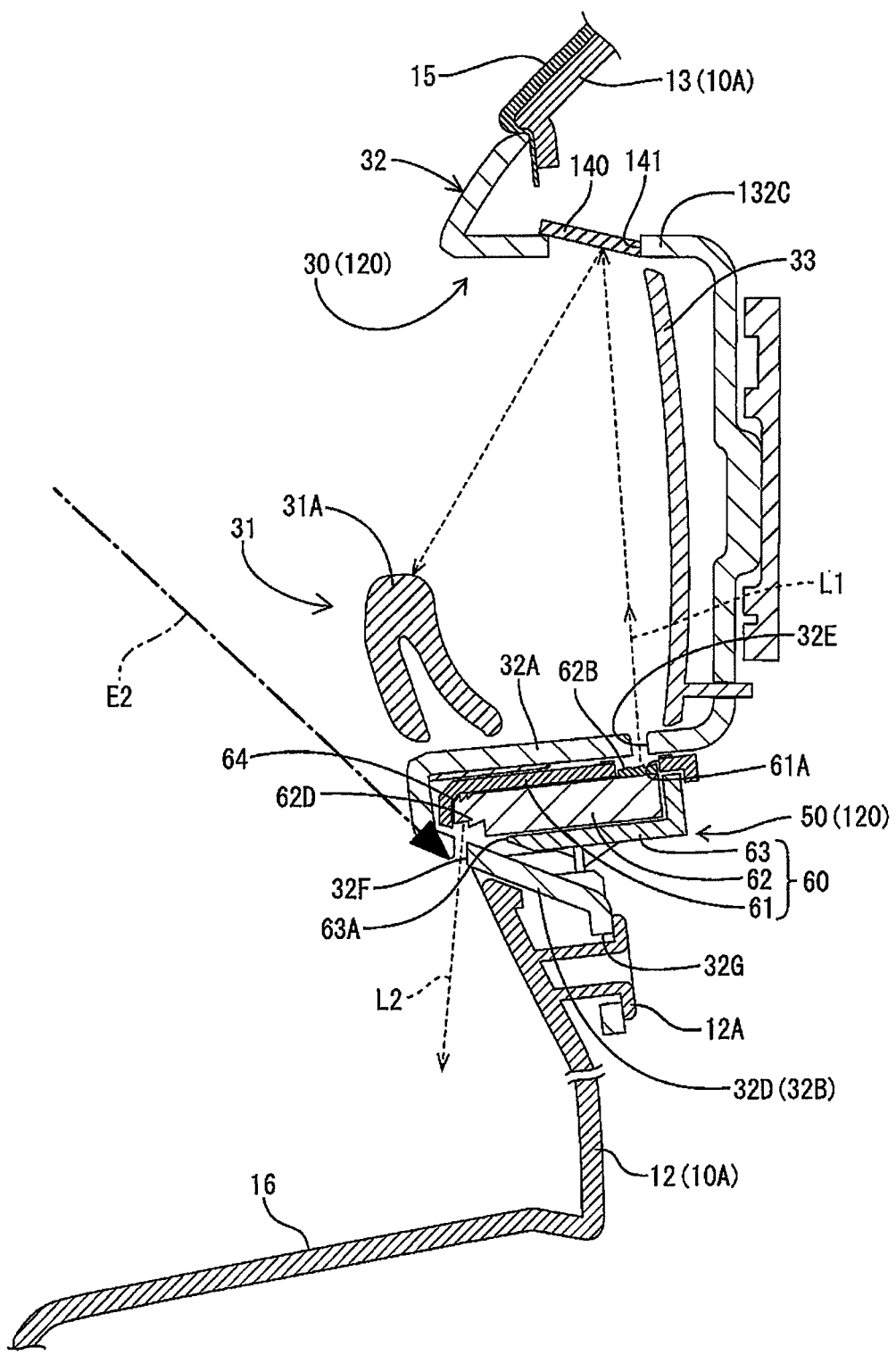
FIG. 9 is a cross-sectional view of an illumination device according to the second embodiment.

As illustrated in FIG. 9, the bezel 32 has an upper wall 132C that is not sloped and extends in the horizontal direction. The upper wall 132C has a mounting hole 141 that is a through hole. A light reflector 140 having a flat plate-like shape is attached to the upper wall 132C so as to close the mounting hole 141. The light reflector 140 is slanted so as to incline toward the inner side of the interior of the vehicle. The light reflector 140 is a part of the upper wall 132C. The light reflector 140 is a sloped portion that inclines toward the inner side of the interior of the vehicle. The light reflector 140 is in a color having high light reflectivity such as white.

Even through the upper wall 132C of the bezel 32 is not sloped, the light reflector 140 inclines toward the inner side of the interior of the vehicle. Therefore, the light exiting from the light exit hole 32E is more likely to be reflected toward the inner side of the interior of the vehicle. Furthermore, the light reflector 140 is attached so as to close the mounting hole 141. Therefore, the occupant is less likely to directly see the light reflector 140 and the decent appearance can be provided.

<Third Embodiment>

The third embodiment will be explained with reference to FIG. 10. The same parts as those in the above embodiments will be indicated by the same symbols and will not be explained. An illumination device 220 for a vehicle includes a light reflector having a different configuration from that in the above embodiments.

A light reflector 240 has a curved cross section that curves toward the handle 31A. The bezel 32 has an upper wall 232C and a back wall 232D. The upper wall 232C and the back wall 232D have cutout portions that form a mounting hole 241. The light reflector 240 is attached to the bezel 32 so as to close the mounting hole 241. Specifically, an end 241A of the light reflector 240 on the inner side of the interior of the vehicle is attached to the upper wall 232C from above and an end 241B on the outer side of the interior of the vehicle is attached to the back wall 232D from the side.

Figure 10:
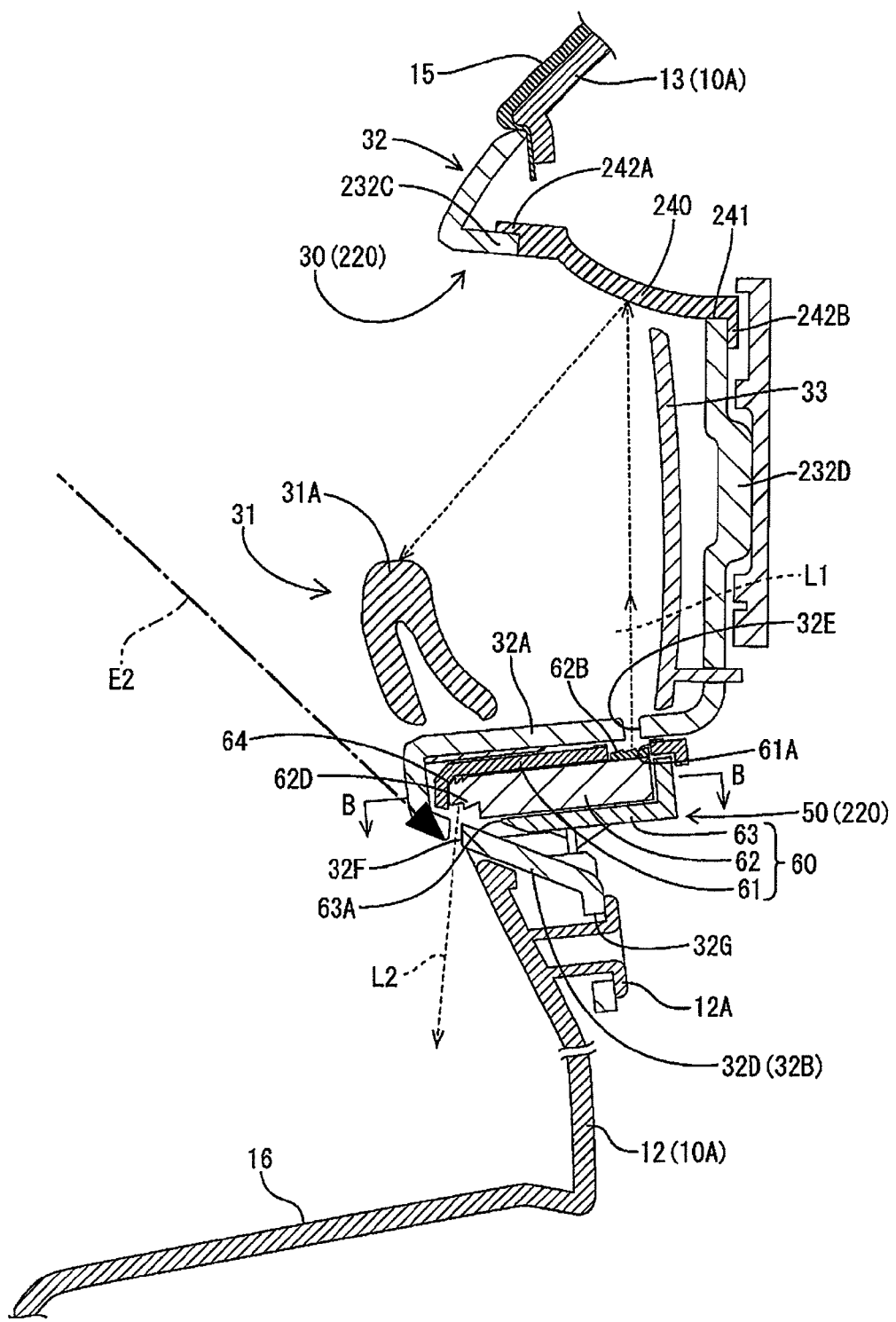
FIG. 10 is a cross-sectional view of an illumination device according to the third embodiment.

Because the light reflector 240 is formed in a shape that curves toward the handle 31A, beams of light exiting from the light exit hole 32E indicated by arrow L1 in FIG. 10 scatter after reflected by the light reflector 240. With this configuration, a larger area is illuminated with the light reflected by the light reflector 240.

<Fourth Embodiment>

Figure 11:
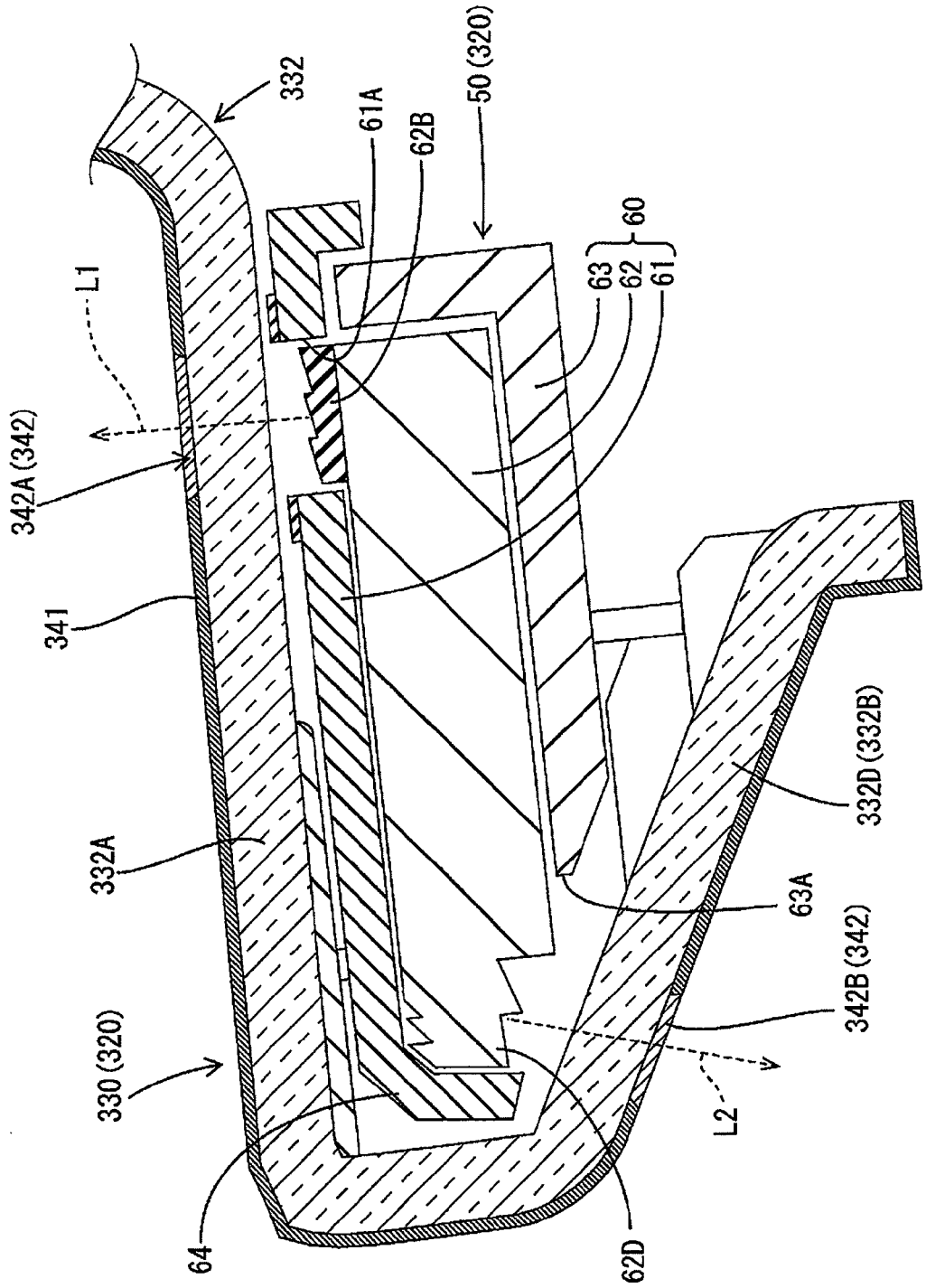
FIG. 11 is a cross-sectional view of an illumination device according to the fourth embodiment.

The fourth embodiment will be explained with reference to FIG. 11. The same parts as those in the previous embodiments will be indicated by the same symbols and will not be explained. In the above embodiments, the light exit hole 32E is provided as a light exit portion. An illumination device 320 for a vehicle includes a light exit portion having a different configuration from that in the previous embodiments.

A bezel 332 of an inside handle well 330 includes a lower wall 332A, a lower wall 332 and a sloped wall 332D. The bezel 332 is made of synthetic resin having a high capability of light transmission (or highly transparent synthetic resin) such as acrylic and polycarbonate. Surfaces of the bezel 332 on the inner side of the interior of the vehicle have light transmissive areas 342 and light blocking areas 341.

The light transmissive areas 342 are provided in portions of the bezel 332 opposite the upper light emitting portion 62B and the lower light emitting portion 62D of the light source 50, respectively. The bezel 332 has a light blocking areas 341 on an outer surface of a portion thereof other than the portions in which the light transmissive areas 342 are provided. In FIG. 11, the light transmissive area 342 provided in the portion opposite the upper light emitting portion 62B is indicated by symbol 342A, the light transmissive area 342 provided in the portion opposite the lower light emitting portion 62D is indicated by symbol 342B.

The light transmissive areas 342 may be formed of material having a high capability of light transmission or by reducing the thickness so that light can pass therethrough.

The bezel 332 is made of material having a high capability of light transmission and has the light transmissive area 342A (a light exit portion) and the light transmissive area 342B. With this configuration, the space above the light source 50 (the inside of the inside handle well 130) and the space below the light source 50 (the switch base 16) are illuminated. Namely, the light exit portion is not limited to the light exit hole. Other configurations may be applicable as long as light emitted from the light source 50 is directed to the inside of the inside handle well.

<Other Embodiments>

The present invention is not limited to the above embodiments explained in the above description and the drawings. The technology described herein may include the following embodiments.

Figure 12:
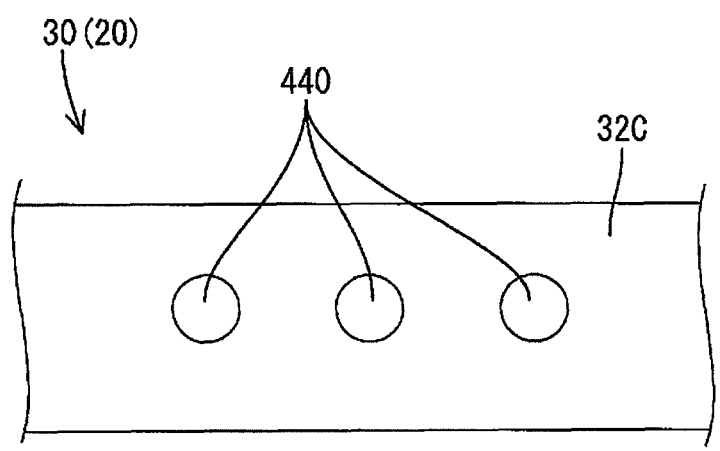
FIG. 12 is a view of a modification of a light reflector.
Figure 13:
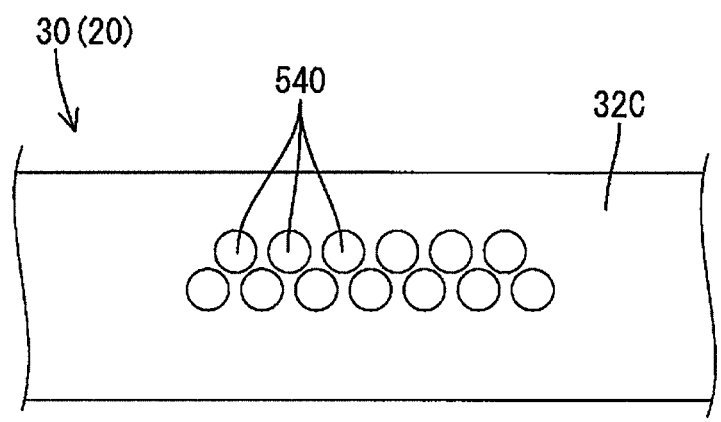
FIG. 13 is a view of another modification of the light reflector.

The light reflector may have the configuration illustrated in FIG. 12. A plurality of round light reflectors 440 are arranged on the upper wall 32C. Alternatively, round light reflectors 540 illustrated in FIG. 13 may be printed on the surface of the upper wall 32C by dot printing. The color of the light reflectors is not limited to white. Any color having light reflectivity can be used. The light reflector may be formed integrally with the upper wall of the inside handle well.

The area in which the light reflector is arranged is not limited to that in the above embodiments. The light reflector can be arranged in any area as long as light reflected by the light reflector is directed toward the inside handle assembly 31. The positional relationships among the inside handle assembly 31, the light exit hole 32E and the light reflector 40 can be altered. The inside handle assembly 31, the light exit hole 32E and the light reflector 40 may be arranged in this order from the inner side of the interior of the vehicle.

The inside handle well 30 is formed by the inside handle bezel 32 and the inside handle cover 33 in the above embodiments. However, the configuration of the inside handle well 30 is not limited to such a configuration. An inside handle well may be formed in the door trim 10.

The light source 50 includes the LED 51 (a main component) and the light guide member 60. However, the configuration of the light source 50 is not limited to such a configuration. The light source 50 may not include the light guide member. In that case, the inside of the inside handle well 30 and the handle 31A are illuminated directly by the LED 51. The main component can be other type of light source such as a light bulb.

The invention claimed is:

1. An illumination device for a vehicle comprising:
a light source; and
an inside handle well disposed in a door trim of a vehicle for housing an inside handle including a holding portion, the inside handle well having a lower wall, an upper wall, and an opening, the lower wall having a light exit portion configured such that light emitted from the light source arranged under the lower wall exits therethrough and travels to an inside of the inside handle well, the upper wall having a light reflecting portion configured to reflect light exiting through the light exit portion and traveling upward in the inside handle well toward the inside handle, the opening being on an inner side of an interior of the vehicle.

2. The illumination device according to claim 1, wherein the light reflecting portion extends along the holding portion of the inside handle.

3. The illumination device according to claim 1, wherein the light reflecting portion is arranged more to the front of the vehicle than the light exit portion.

4. The illumination device according to claim 1, wherein the light reflecting portion is arranged between the inside handle and the light exit portion in plan view.

5. The illumination device according to claim 1, wherein
the upper wall has a sloped portion inclining toward the inner side, and
the light reflecting portion is arranged in the sloped portion and on the outer side of the interior of the vehicle than the inside handle.

6. The illumination device according to claim 1, wherein the inside handle well has an extending wall that extends from an edge of the lower wall so as to cover the light source from below and sides, the extending wall having a lower light exit portion through which light emitted from the light source exits downward.

7. The illumination device according to claim 6, wherein
the light source has an upper light emitting portion and a lower light emitting portion;
the light exit portion and the lower light exit portion are arranged opposite the upper light emitting portion and the lower light emitting portion, respectively;
the lower wall has a light blocking area on an outer surface of a portion thereof other than the light exit portion; and
the extending wall has a light blocking area on an outer surface of a portion thereof other than the lower light exit portion.

8. An illumination device for a vehicle comprising:
a light source;
an inside handle well disposed in a door trim of a vehicle for housing an inside handle including a holding portion, the inside handle well having a lower wall, an upper wall, and an opening, the lower wall having a light exit portion configured such that light emitted from the light source arranged under the lower wall exits therethrough and travels to an inside of the inside handle well, the upper wall having a mounting hole that is a through hole, the opening being on an inner side of an interior of the vehicle; and a light reflector attached to the upper wall so as to close the mounting hole of the upper wall and configured to reflect light exiting through the light exit portion and traveling upward in the inside handle well toward the inside handle.

9. The illumination device according to claim 8, wherein the light reflector extends along the holding portion of the inside handle.

10. The illumination device according to claim 8, wherein the upper wall extends in a horizontal direction, and the light reflector is formed in a flat plate-like shape and slanted so as to incline toward the inner side of the interior of the vehicle.

11. The illumination device according to claim 8, wherein the inside handle well has an extending wall that extends from an edge of the lower wall so as to cover the light source from below and sides, the extending wall having a lower light exit portion through which light emitted from the light source exits downward.

12. The illumination device according to claim 11, wherein the light source has an upper light emitting portion and a lower light emitting portion;

the light exit portion and the lower light exit portion are arranged opposite the upper light emitting portion and the lower light emitting portion, respectively;

the lower wall has a light blocking area on an outer surface of a portion thereof other than the light exit portion; and the extending wall has a light blocking area on an outer surface of a portion thereof other than the lower light exit portion.

13. An illumination device for a vehicle comprising:
a light source;
an inside handle well disposed in a door trim of a vehicle for housing an inside handle including a holding portion, the inside handle well having a lower wall, an upper wall, a back wall, and an opening, the lower wall having a light exit portion configured such that light emitted from the light source arranged under the lower wall exits therethrough and travels to an inside of the inside handle well, the upper wall and the back wall having cutout portions forming a mounting hole, the opening being on an inner side of an interior of the vehicle; and a light reflector attached to the upper wall and the back wall so as to close the mounting hole and configured to reflect light exiting through the light exit portion and traveling upward in the inside handle well toward the inside handle.

14. The illumination device according to claim 13, wherein the light reflector extends along the holding portion of the inside handle.

15. The illumination device according to claim 13, wherein the light reflector curves toward the holding portion of the inside handle.

16. The illumination device according to claim 13, wherein the inside handle well has an extending wall that extends from an edge of the lower wall so as to cover the light source from below and sides, the extending wall having a lower light exit portion through which light emitted from the light source exits downward.

17. The illumination device according to claim 16, wherein the light source has an upper light emitting portion and a lower light emitting portion;

the light exit portion and the lower light exit portion are arranged opposite the upper light emitting portion and the lower light emitting portion, respectively;

the lower wall has a light blocking area on an outer surface of a portion thereof other than the light exit portion; and the extending wall has a light blocking area on an outer surface of a portion thereof other than the lower light exit portion.

* * * * *